UNITED STATES PATENT OFFICE 2,199,814

AZO DYESTUFFS INSOLUBLE IN WATER AND FIBER DYED THEREWITH

Walter Bröker, Offenbach-on-the-Main, Germany, assignor to General Aniline & Film Corporation, a corporation of Delaware No Drawing. Application December 23, 1938, Serial No. 247,407. In Germany December 24, 1937

10 Claims. (Cl. 260—203)

The present invention relates to azo dyestuffs insoluble in water and to fiber dyed therewith; more particularly, it relates to azo dyestuffs of the following general formula:

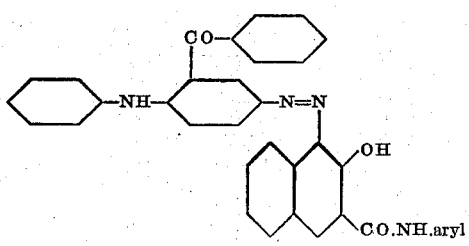

wherein the benzene nuclei may contain substituents.

I have found that valuable black azo dyestuffs are obtainable by coupling, in substance, on the fiber or on a substratum adapted for the production of lakes a diazo-compound from 4-amino-2-benzoyl-diphenylamine or a substitution product thereof with an arylide of 2.3-hydroxynaphthoic acid.

In German patent specification No. 620,460 and French patent specification No. 37,511 is disclosed a manufacture of water-insoluble azo-dyestuffs by coupling with a 2.3-hydroxynaphthoic acid arylide a diazo-compound from a 4-aminodiarylamine containing in 2-position a functional derivative of the carboxyl group, such as an ester or a substituted amide, blue dyestuffs being generally obtained. When compared with these known dyestuffs, the new dyestuffs which throughout yield deep-black tints, are distinguished by a better tinctorial strength and improved properties of fastness.

The new dyestuffs may, with special advantage, be used for the production of fast prints.

The 4-amino-2-benzoyl-diphenylamines used as diazo-components in the present process may be prepared by condensing 1-benzoyl-2-chloro-5-nitrobenzene and the substitution products thereof obtainable according to known processes (cp. Berichte der Deutschen Chemischen Gesellschaft, vol. 31 (1898), page 1695) with aniline and the substitution products thereof and reducing subsequently the 4-nitro-2-benzoyl-diphenylamines thus obtained.

The following examples serve to illustrate the invention, but they are not intended to limit it thereto; the parts are by weight:

1. Bleached cotton fabric is padded with a solution containing per liter 15 parts of 1-(2'.3'-hydroxynaphthoylamino)-2-methylbenzene, 29 parts of a caustic soda solution of 34° Bé. and 20 parts of Turkey red oil and dried. The fabric thus treated is then printed with the following printing paste:

| | Parts |
|---|---|
| The diazonium zinc chloride compound from 4-amino-2-benzoyl-diphenylamine | 22 |
| Acetic acid of 50 per cent strength | 40 |
| Water | 438 |
| Starch tragacanth thickening | 500 |
| | 1,000 |

The material is then dried, passed through a solution containing per liter 2 grams of sodium carbonate and having a temperature of 80° C. to 90° C., rinsed and soaped at boiling temperature.

A deep-black print is obtained. In the same manner the dyestuff can be produced on viscose artificial silk or on mixed fabrics from cotton and viscose artificial silk.

The dyestuff is characterized by the following formula:

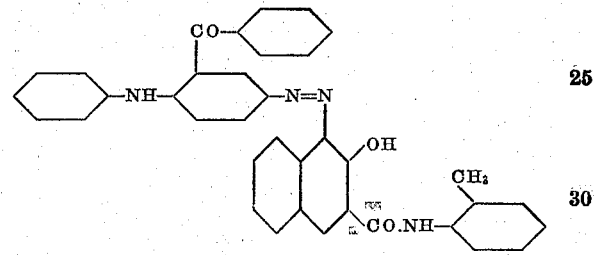

2. Cotton piece goods are impregnated with a solution containing per liter 15 parts of 1-(2'.3'-hydroxy-naphthoyl-amino)-4-chlorobenzene, dried and printed with the following paste:

| | Parts |
|---|---|
| The diazonium zinc chloride compound from 4-amino-4'-methoxy-2-(4''-methoxy-benzoyl)-diphenylamine | 20 |
| Water | 450 |
| Starch tragacanth thickening | 500 |
| Acetic acid of 50 per cent strength | 30 |
| | 1,000 |

The material is dried, passed through a hot sodium carbonate solution, rinsed and soaped in the usual manner. A deep-black print is thus obtained.

3. A diazo-solution prepared as usual from 28.8 parts of 4-amino-2-(4''-methylbenzoyl)-diphenylamine and containing 15 parts of acetic acid is caused to run gradually, while well stirring at 15° C., into a solution prepared from 35.8 parts of 1-(2'.3' - hydroxynaphthoylamino) - 2.4 - dimethoxy-5-chlorobenzene, 40 parts of caustic soda solution of 34° Bé., 5 parts of Turkey red oil and 1500 parts of water. When the introduction is finished, the whole is further stirred for 15 minutes, then rendered alkaline by means of a sodium carbonate solution, further stirred for 30 minutes, filtered with suction and the solid matter washed until neutral. The black dyestuff thus obtained is preferably worked up in the form of a paste and yields, with the usual substrata, valuable color lakes.

The following table illustrates a number of other dyestuffs obtainable according to this invention:

| Diazo-component | Coupling-component | Shade of the dyestuff |
|---|---|---|
|  | 2'.3'-hydroxynaphthoyl— |  |
| 4-amino-2-(4''-dimethylaminobenzoyl)-diphenylamine | 1-amino-2-methylbenzene | Deep greenish black. |
| Do. | 1-amino-2-methoxybenzene | Reddish-black. |
| 4-amino-4'-methoxy-2-(4''-methylbenzoyl)-diphenylamine | 2-aminonaphthalene | Deep black. |
| Do. | 1-amino-2-methyl-4-chlorobenzene | Do. |
| Do. | 1-amino-3-nitrobenzene | Do. |
| 4-amino-4'-benzyloxy-2-benzoyl-diphenylamine | 1-amino-4-chlorobenzene | Do. |
| 4-amino-2'-ethoxy-2-benzoyl-diphenylamine | 1-amino-4-chlorobenzene | Do. |
| 4-amino-4'-chloro-2-benzoyl-diphenylamine | Aminobenzene | Brownish-black |
| 4-amino-2'-methoxy-5'-methyl-2-benzoyl-diphenylamine | 1-amino-4-chlorobenzene | Deep black. |
| 4-amino-6-methyl-2-benzoyl-diphenylamine | 1-amino-4-methoxy-2-methyl-benzene. | Do. |
| 4-amino-4'-methoxy-2-benzoyl-diphenylamine | 1-aminonapthalene | Do. |
| 4-amino-4'-ethoxy-2-benzoyl-diphenylamine | 1-amino-2-methoxybenzene | Do. |
| 4-amino-2-(4''-methoxy-benzoyl)-diphenylamine | Aminobenzene | Reddish black. |
| 4-amino-2-(4''-ethoxy-benzoyl)-diphenylamine | 1-amino-2-methylbenzene | Do. |
| 4 - amino - 4' - methoxy - 2 - (4'' - ethoxy - benzoyl) - diphenylamine. | 1-amino-4-chlorobenzene | Neutral black. |
| Do. | 1-amino-5-nitrobenzene | Do. |
| 4-amino-2'.4'-dimethoxy-2-benzoyl-diphenylamine | 1-amino-2-methoxybenzene | Do. |
| Do. | 1-amino-2-methyl-4-methoxy-benzene. | Do. |
| 4-amino-3'-methyl-2-benzoyl-diphenylamine | 1-amino-4-methoxybenzene | Black. |
| 4-amino-2-(4''-diethyl-aminobenzoyl)-diphenylamine | 1-amino-2-ethoxybenzene | Do. |

Since an object of the present invention is to produce dyestuffs of good fastness properties which dyestuffs are insoluble in water, it is to be understood that the aromatic nuclei of the general formula appearing in the appended claims do not contain any substituents which are known to render the dyestuffs soluble in water. Substituents of this kind are, for instance, the sulfonic acid and carboxylic acid group.

I claim:

1. The water-insoluble azo dyestuffs of the following general formula

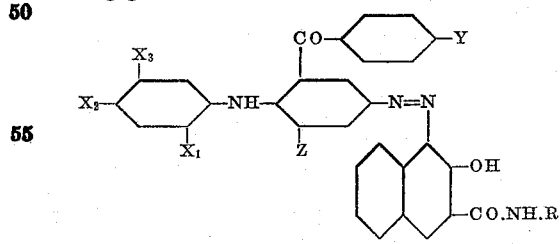

wherein $X_1$ stands for a member of the group consisting of hydrogen and alkoxy, $X_2$ for a member of the group consisting of hydrogen, alkoxy, halogen and benzyloxy, $X_3$ for a member of the group consisting of hydrogen and methyl, at least one X being hydrogen, Y stands for a member of the group consisting of hydrogen, alkoxy, methyl and dialkylamino, Z for a member of the group consisting of hydrogen and methyl, and R means a member of the group consisting of radicals of the benzene and naphthalene series, yielding, when produced on the fiber, black dyeings of good fastness properties, particularly of very good fastness to washing, and of great tinctorial strength.

2. The water-insoluble azo dyestuffs of the following general formula

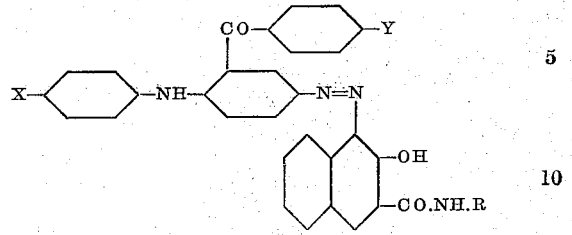

wherein X stands for a member of the group consisting of hydrogen, alkoxy, halogen and benzyloxy, Y for a member of the group consisting of hydrogen, alkoxy, methyl and dialkylamino and R means a member of the group consisting of radicals of the benzene and naphthalene series, yielding, when produced on the fiber, black dyeings of good fastness properties, particularly of very good fastness to washing, and of great tinctorial strength.

3. The water-insoluble azo dyestuff of the following formula

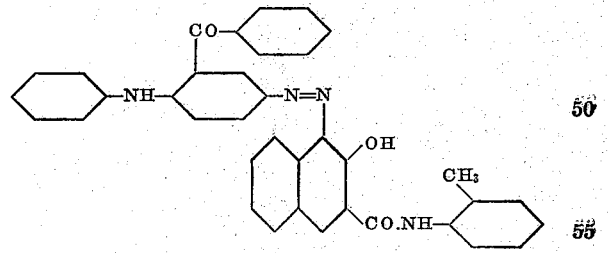

yielding, when produced on the fiber, deep-black dyeings of good fastness properties, particularly of very good fastness to washing, and of great tinctorial strength.

4. The water-insoluble azo dyestuff of the following formula

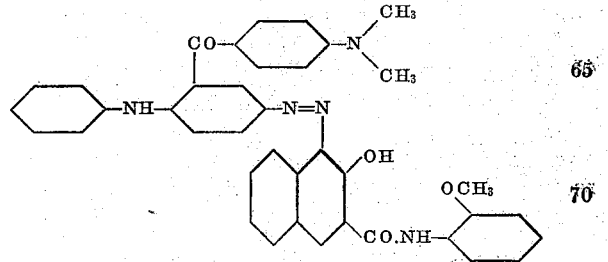

yielding, when produced on the fiber, reddish black dyeings of good fastness properties, particularly of very good fastness to washing, and of great tinctorial strength.

5. The water-insoluble azo dyestuff of the following formula

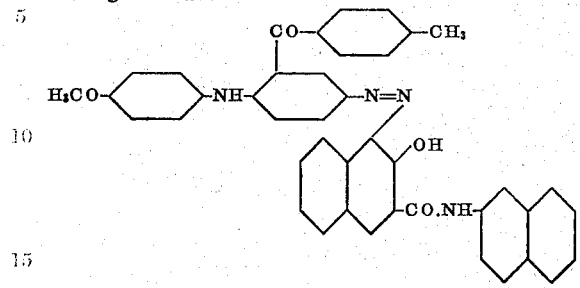

yielding, when produced on the fiber, deep black dyeings of good fastness properties, particularly of very good fastness to washing, and of great tinctorial strength.

6. Fiber dyed with the water-insoluble azo dyestuffs as claimed in claim 1.

7. Fiber dyed with the water-insoluble azo dyestuffs as claimed in claim 2.

8. Fiber dyed with the water-insoluble azo dyestuff as claimed in claim 3.

9. Fiber dyed with the water-insoluble azo dyestuff as claimed in claim 4.

10. Fiber dyed with the water-insoluble azo dyestuff as claimed in claim 5.

WALTER BRÖKER.